(12) United States Patent
Allouche et al.

(10) Patent No.: US 10,572,636 B2
(45) Date of Patent: Feb. 25, 2020

(54) AUTHENTICATION BY FAMILIAR MEDIA FRAGMENTS

(71) Applicant: International Business Machines Corporation, Armonk, NY (US)

(72) Inventors: Yair Allouche, Dvira (IL); David Asulin, Beer Sheva (IL)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 15/610,655

(22) Filed: Jun. 1, 2017

(65) Prior Publication Data
US 2018/0349579 A1    Dec. 6, 2018

(51) Int. Cl.
| | | |
|---|---|---|
| G06F 7/04 | (2006.01) | |
| G06F 21/31 | (2013.01) | |
| G06F 21/36 | (2013.01) | |
| G06F 15/16 | (2006.01) | |

(52) U.S. Cl.
CPC .............. *G06F 21/31* (2013.01); *G06F 21/36* (2013.01)

(58) Field of Classification Search
CPC .......... G06F 21/31; G06F 21/36; G06F 21/46; H04L 63/083; H04L 63/20; H04L 9/0872; H04L 9/3226
USPC .......................................................... 726/7
See application file for complete search history.

(56) References Cited

U.S. PATENT DOCUMENTS

| | | | | |
|---|---|---|---|---|
| 863,556 A * | 8/1907 | Priest ...................... | F04B 35/04 | |
| | | | | 417/419 |
| 7,174,462 B2 * | 2/2007 | Pering .................... | G06F 21/36 | |
| | | | | 713/168 |
| 7,522,182 B2 * | 4/2009 | Bang ...................... | H04L 51/38 | |
| | | | | 348/14.01 |
| 8,132,252 B2 * | 3/2012 | Kernene ................. | H04L 63/18 | |
| | | | | 380/211 |
| 8,176,159 B2 * | 5/2012 | Kashi .................... | H04L 9/3226 | |
| | | | | 709/203 |
| 8,301,897 B2 * | 10/2012 | Turner .................. | H04L 9/3271 | |
| | | | | 380/255 |
| 8,458,485 B2 | 6/2013 | Bandyopadhyay et al. | | |

(Continued)

OTHER PUBLICATIONS

Srinivas et al., "A Study on Image Based Authentication in Automated Security Systems", Journal of Innovation in Computer Science and Engineering, Dec. 2015, pp. 64-70, vol. 5(1).

*Primary Examiner* — Gary S Gracia
(74) *Attorney, Agent, or Firm* — Dvir Gassner

(57) ABSTRACT

A method comprising using at least one hardware processor for receiving a plurality of media files captured in real-time by a sensor of a client terminal, wherein each of the plurality of media files comprises data captured from the environment surrounding the client terminal. The method comprises extracting a plurality of captured media fragments from the plurality of media files. The method comprises retrieving a plurality of random media fragments from a database. The method comprises sending the plurality of captured media fragments and the plurality of random media fragments to the client terminal or to a different client terminal, for presentation to a user in an arbitrary order. The method comprises receiving from the client terminal or the different client terminal a selection of the plurality of captured media fragments. The method comprises sending a user authentication to a secure server module based on the selection.

14 Claims, 5 Drawing Sheets

(56) References Cited

U.S. PATENT DOCUMENTS

| | | | |
|---|---|---|---|
| 8,803,980 B2* | 8/2014 | Klassen | G01S 19/39 348/207.1 |
| 8,812,861 B2 | 8/2014 | Osborn et al. | |
| 8,832,810 B2 | 9/2014 | Cheswick et al. | |
| 8,881,251 B1* | 11/2014 | Hilger | H04L 63/083 713/183 |
| 8,918,851 B1* | 12/2014 | Iannamico | G06F 21/36 726/7 |
| 9,313,439 B2* | 4/2016 | Lee | G06F 3/011 |
| 10,091,464 B2* | 10/2018 | Baxter | H04N 7/181 |
| 2004/0093527 A1* | 5/2004 | Pering | G06F 21/36 726/5 |
| 2004/0203863 A1* | 10/2004 | Huomo | H04W 4/029 455/456.1 |
| 2004/0230843 A1* | 11/2004 | Jansen | G06F 21/36 726/7 |
| 2006/0142027 A1* | 6/2006 | Krishnamurthi | H04M 1/72572 455/457 |
| 2007/0220594 A1 | 9/2007 | Tulsyan | |
| 2008/0072293 A1* | 3/2008 | D'Urso | G06F 21/31 726/4 |
| 2008/0147546 A1* | 6/2008 | Weichselbaumer | G06Q 20/105 705/41 |
| 2009/0232351 A1* | 9/2009 | Kagitani | G06F 21/36 382/100 |
| 2011/0208716 A1* | 8/2011 | Liu | G06F 21/36 707/710 |
| 2012/0023574 A1* | 1/2012 | Osborn | G06F 21/36 726/19 |
| 2013/0090086 A1* | 4/2013 | Lopez Lopez | H04W 12/12 455/410 |
| 2013/0142405 A1* | 6/2013 | Nada | G06K 9/00087 382/124 |
| 2013/0269013 A1* | 10/2013 | Parry | H04L 63/0861 726/7 |
| 2016/0179070 A1* | 6/2016 | Hwang | G05B 15/02 700/83 |
| 2016/0219036 A1* | 7/2016 | Devkar | H04L 63/20 |
| 2017/0147862 A1* | 5/2017 | Kim | G06F 16/5838 |

* cited by examiner

AUTHENTICATION BY FAMILIAR MEDIA FRAGMENTS

BACKGROUND

The invention relates to the field of computerized user authentication.

User authentication, in computers, is the process of determining whether a user is authorized to access computerized resources. User authentication techniques may be classified into three categories.

The first category may be referred to as something you know (e.g., a password). This form of user authentication may be the most common form of computerized authentication. The main drawback of the category may be that something that you know may be forgotten, stolen, copied, or the like. Users may use easy to remember passwords based on their personal information that may be easy to guess, deduce, determine with a minimal amount of brute force effort, and/or the like. Furthermore, users may use similar or identical passwords for different purposes, which reduces the security of the password.

The second category may be referred to as something you have. This form of user authentication helps avoid forgetting (something you know), copying a password from an email, or the like. However, it may require that some object (e.g., a smart card) be with you when you want to be authenticated. Furthermore, such an object might be stolen and then becomes something an imposter may use to access secured resources.

The third category may be referred to as something you are. This form of human authentication may rely on unique characteristics (usually biological characteristics, i.e. biometrics) of users to verify a user identity. In this category of authentication, there may be no need to remember anything, to carry any object, or the like, in order to be authenticated. The main drawback of this category may be that the unique characteristics cannot be replaced, such as amputation of a finger. In addition, biometric sensors may be expensive (i.e. retinal imagers), have insufficient accuracy (i.e. automatic facial recognition), and/or the like.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for receiving a plurality of media files captured in real-time by a sensor of a client terminal, where each of the plurality of media files comprises data captured from the environment surrounding the client terminal. The method comprises extracting a plurality of captured media fragments from the plurality of media files. The method comprises retrieving a plurality of random media fragments from a database. The method comprises sending the plurality of captured media fragments and the plurality of random media fragments to the client terminal or to a different client terminal, for presentation to a user in an arbitrary order. The method comprises receiving from the client terminal or the different client terminal a selection of the plurality of captured media fragments. The method comprises sending a user authentication to a secure server module based on the selection.

In some embodiments, each of the plurality of media files is selected from the group consisting of: an image file, an audio recording file, and a video recording file.

In some embodiments, the plurality of captured media fragments comprises visual data, and the presentation is on a grid presented on a display connected to the client terminal.

In some embodiments, the receiving is performed iteratively a specific number of the plurality of captured media fragments have been detected in the plurality of media files.

In some embodiments, the extracting is performed using an object fragment detection algorithm.

In some embodiments, the sending, the presentation, and the receiving of the selection are to a second client terminal.

There is provided, in accordance with an embodiment, a computer program product comprising a non-transitory computer-readable storage medium having program code embodied therewith, the program code executable by at least one hardware processor to perform the actions described herein.

There is provided, in accordance with an embodiment, a system, comprising at least one hardware processor, and a non-transitory computer-readable storage medium having program code embodied therewith, the program code executable by the at least one hardware processor to perform the actions described herein.

There is provided, in accordance with an embodiment, a method comprising using at least one hardware processor for receiving, at a client terminal, a request for user authentication. The method comprises retrieving a plurality of media files captured previously in real-time by a sensor, where each of the plurality of media files comprises data captured from an environment familiar to a user. The method comprises sending to the client terminal a plurality of captured media fragments and the plurality of random media fragments for presentation to the user in an arbitrary order, where the plurality of captured media fragments were extracted from the plurality of media files, and where the plurality of random media fragments were retrieved from a generic image database. The method comprises receiving a selection of the plurality of captured media fragments, where the selection of the plurality of captured media fragments are determined by the user on a user interface of the client terminal. The method comprises sending, to the client terminal, the user authentication to access a secure server module based on the selection being complaint with the plurality of captured media fragments.

According to some embodiments, the method further comprises repeating the actions of sending the fragments and receiving the selection until and further comprising iteratively computing a user authentication probability, where when the user authentication probability is above threshold a user authentication is sent to the client terminal.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclose are computerized methods, systems, and program products for a "Something you know" authentication technique. A user may upload several image files captured in real-time of the environment the user is present in during the signup process, and taken specifically for the authentication purpose. The images of the image files may show an environment that the user is highly familiar with, such as a user's apartment, office, favorite coffee shop, and/or the like, where the user terminal is located and taken during the signup process.

For later authenticating the user, the user may be presented with fragments of the uploaded images together with other, random, image fragments. The user may choose which of the fragments, which were extracted from the uploaded images, the user identifies as environments the user is familiar with. Since the user is highly familiar with the environment the images show, even a small section of the image may be enough for the user to recognize that it is a part of the images the user uploaded in real-time. For example, the user uploads a few images from a kitchen and a living room. Since the user is familiar with the kitchen and living room, even a small section, such as of a vase standing on a shelf, or a part of a dining table, may be sufficient to identify that this fragment as part of the user's environment during the signup process. On the other hand, it may be very hard for an attacker to identify which of the fragments are taken from the images uploaded in real-time by the user, since the images are not saved anyplace else except on the signup server.

Optionally, the user may record short audio snippets of familiar sounds, such as relatives' voices, and the system uses fragments from an audio file for authentication. Optionally, the user may record video clips of familiar places/sounds, such as a work environment, factory, and/or the like, and the system uses this type of data for authentication. For example, the recorded data are audiovisual (AV) recordings, where the images are selected from the video data. For example, the audio recordings are selected from AV recordings. The term AV recordings means any recording of audio and/or visual data from a sensor of a client terminal. As used herein, the term media file means and file containing image data, audio data, video data, and/or the like, of objects that the user may be familiar with, such as views, images of rooms, familiar sounds, familiar kinetic images, and the like.

Figure 1:
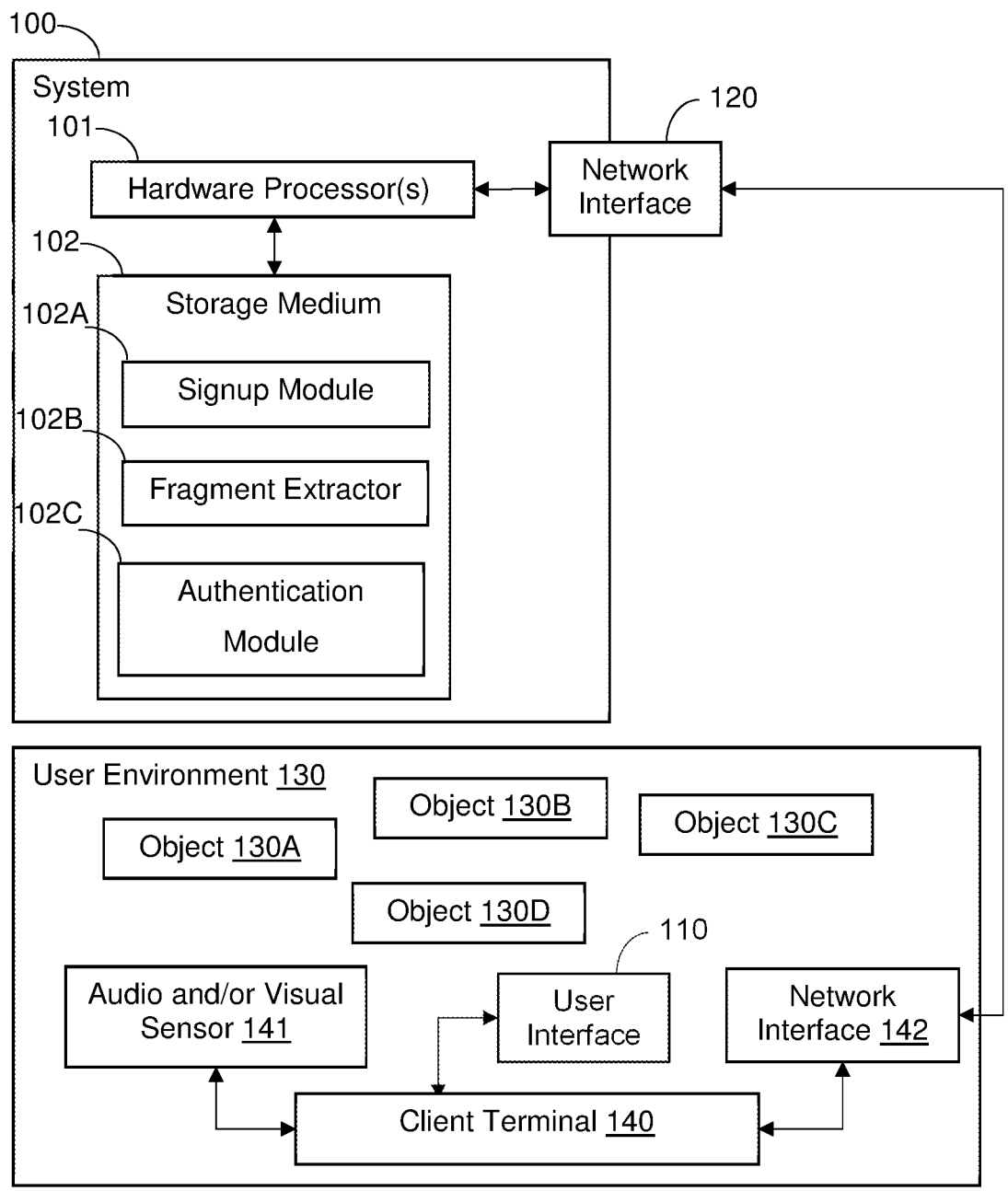
FIG. 1 shows schematically a system for user authentication using familiar media file fragments.

Reference is now made to FIG. 1, which shows schematically a system 100 for user authentication using familiar media fragments. System 100 comprises one or more hardware processors 101, a network interface 120, and a non-transitory computer readable storage medium 102. Storage medium 102 comprises modules, such as a Signup Module 102A, a Fragment Extractor 102B, and an Authentication Module 102C. Signup module 102A receiving a media data file from a Client Terminal 140, and checks that the data is suitable for authentication. The media data file is collected by Client Terminal 140 using one or more AV sensors 141, such as microphone sensors, audio sensors, image sensors, and/or the like, and transferred to system 100 through network interfaces 142 and 120. The media data file includes data, such as audio data or visual data, from Objects (130A, 130B, 130C, 130D, etc.) in the User Environment 130. Fragment Extractor 102B extracts media fragments from the captured data file, and retrieves random fragments, such as from a database of stock images, stock recordings, stock video, and/or the like. Authentication Module 102C sends the captured media fragments and the random fragments for presentation presents on a User Interface 110 of the Client Terminal 140, and receives a selection of captured media fragments. When the user selection of captured media fragments substantially matches the presented captured media fragments the user is authenticated. For example, when all captured media fragments were selected, only captured media fragments were selected, some captured media fragments were selected, and the like.

Figure 2:
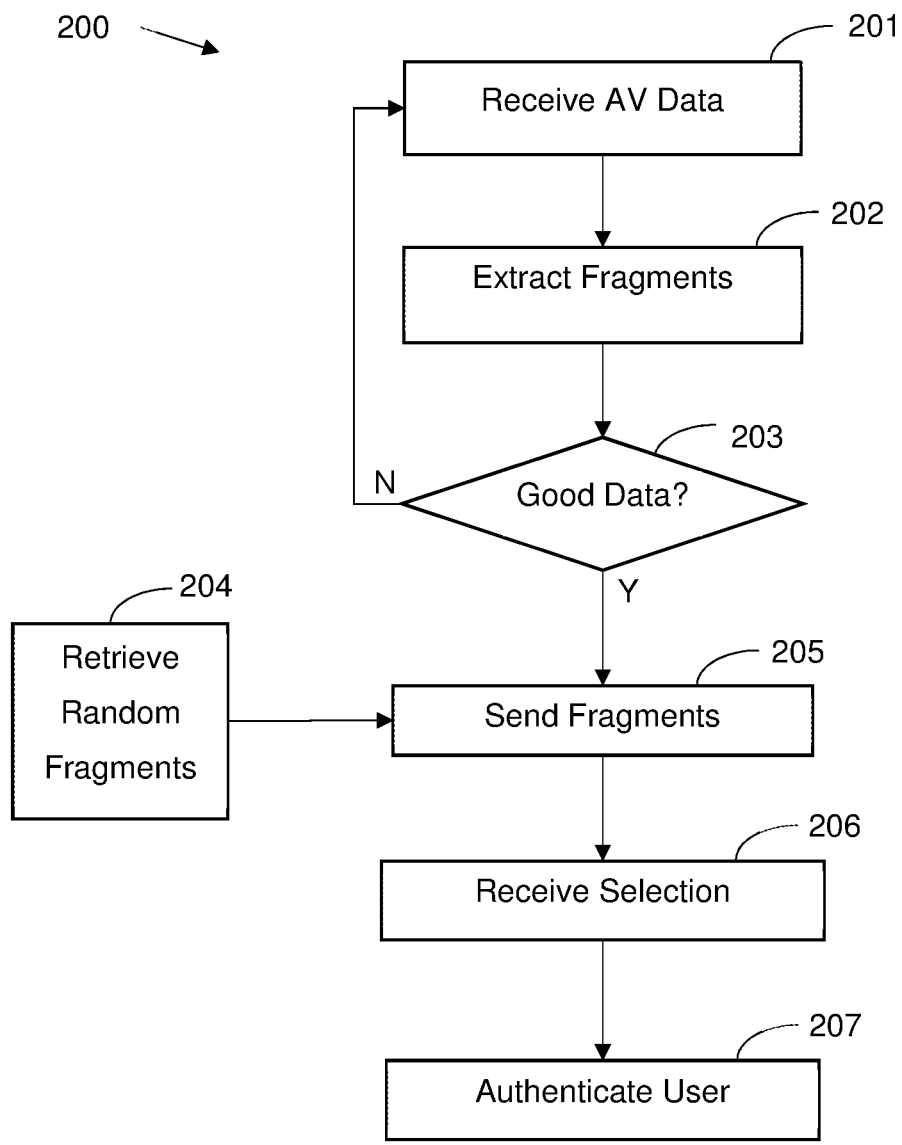
FIG. 2 shows a flowchart of a method (server side) for user authentication using familiar media file fragments.

Reference is now made to FIG. 2, which shows a flowchart of a method 200 (server side) for user authentication using familiar fragments from the media data file. Method 200 may comprise an action of receiving 201 media data files, extracting fragments 202, and when enough fragments have been extracted according to a security policy, storing the fragments on storage medium 102. Otherwise, more media data file is collected at the Client Terminal 140 and subsequently received by server 100. During an authentication process, random fragments, not related to user environment 130, are retrieved 204, and all fragments are sent 205 to Client Terminal 140 for presentation to a user on a display of a user interface 110. The user selects the familiar fragments, and server 100 receives 206 the selection, compares to the known media fragments presented, and when there is a match authenticates 207 the user.

Figure 3:
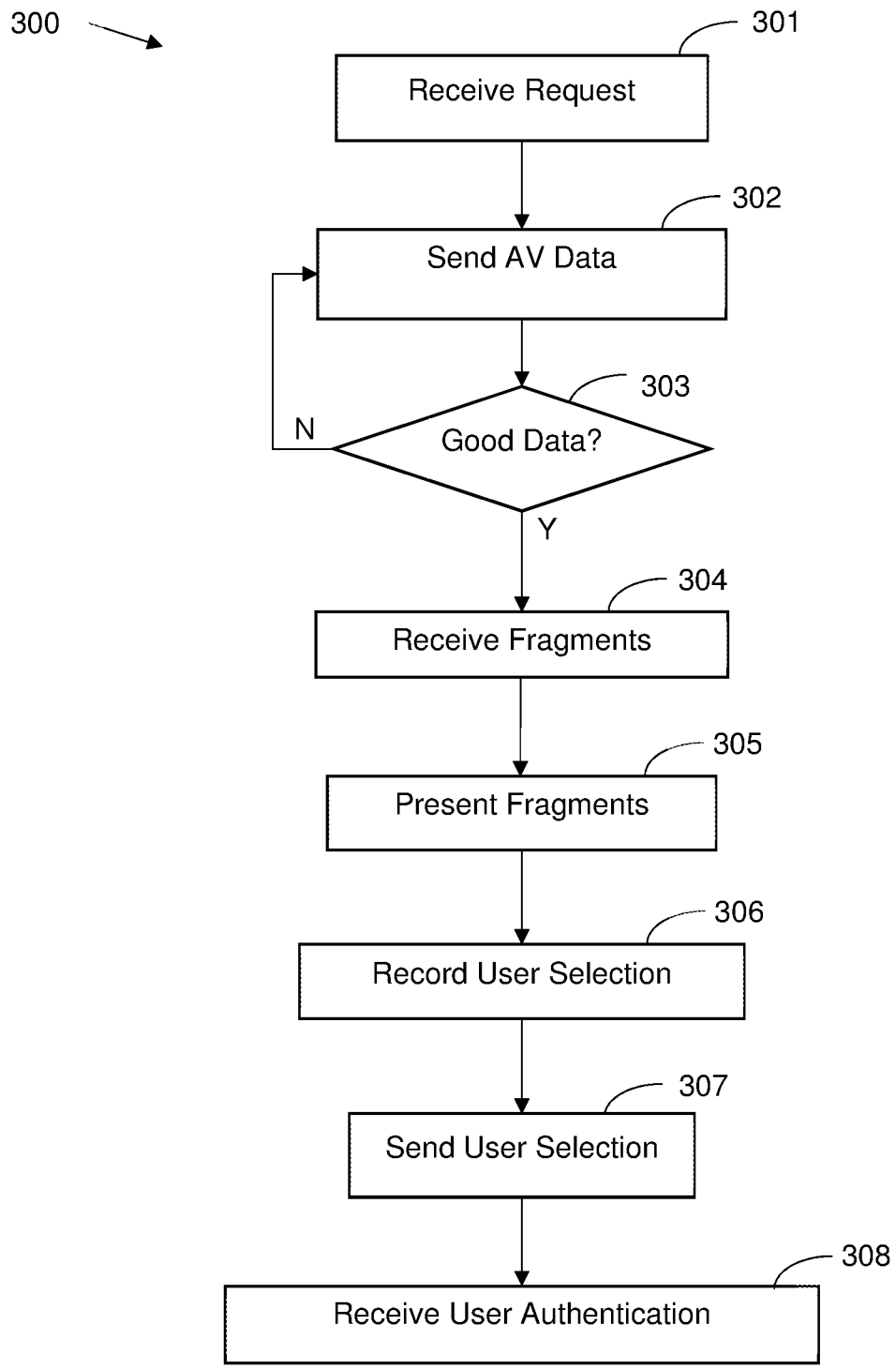
FIG. 3 shows a flowchart of a method (client side) for user authentication using familiar media file fragments.

Reference is now made to FIG. 3, which shows a flowchart of a method 300 (client side) for user authentication using familiar media fragments. Client Terminal 140 receives 301 a request for media files, and Client Terminal 140 collects the media file using AV sensors 141. Media files are sent 302 until server 100 has received enough 303 good data. During authentication, Client Terminal 140 receives 304 fragments, and presents 305 the fragments to a user. Client Terminal 140 records a user selection of some of the fragments, and sends 307 the selection to server 100. When the selection matches the captured media fragments, server sends a user authentication which is received 308 by Client Terminal 140.

The solutions described in this disclosure may consist of two parts, a signup process and an authentication process.

During the signup process, the user captures images in real-time of the environment the client terminal is located in during the signup process, such as a few images of a space the user is familiar with, and provides some of these images to a server. This process is carried out by directly communicating with the terminal's imaging device, for example using a mobile device, a web browser application programming interface (API), a webcam API, and/or the like. Using such a direct connection ensures that no copies of the images taken during the signup process are left on the user's device to be discovered by imposters. This technique is different from passwords that may be written down and may be stolen in the future. This technique validates that the images are taken by the user in real-time, when the client terminal is in a familiar location, and not supplied from a storage location source (such as a web site, a photo album, and/or the like) that may be more prone to forgetting (as the environment may not be as familiar to the user) or discovery by an imposter. The images may be sent to the server using an encrypted connection, and the server stores the images in a secure portfolio for each user. Optionally, the secure portfolio may be to split among multiple servers, and each server may contribute a part of the challenge set for each authentication. During the signup process the server may verify that the images are in a sufficient quality and contained sufficient information for use during the authentication process. For example, image verification is done using clustering object detection algorithms, image entropy, and/or the like. When the set of uploaded images does not satisfy these conditions, the server may repeatedly ask the user for additional or new images until the conditions are satisfied.

Optionally, the user could choose audio and/or video recordings as media for authentication, such as an audio recording file, a video recording file, and the like. These may be instead of or in addition to the images. The audio/video recordings may be collected in a real-time, as the image files are, to avoid potential theft of the media by a potential imposter. To reduce the chance of the audio/video media file containing revealing information, such as the user's name, the recording(s) may be of a predefined phrase generated by the system. The technique may use a voice recognition algorithm to verify that the spoken phrase is indeed the required phrase, for example using mel-frequency cepstral coefficient (MFCC) modeling, dynamic time warping (DTW) technique, and/or like techniques. The techniques may differ from authentication using voice recognition algorithms, as here the user is responsible for the "recognition", and not the system. Given this audio/video data, during the authentication phase the system would present snippets, such as fragments, of these recordings, both from the ones that the user supplied and unknown, random, media fragments from different users, stock media sources, and/or the like.

To authenticate the user, the server may present a challenge set, comprising n image fragments. The fragment generation may be done using a content aware method utilizing object detection and information measures, such that only fragments that contain a sufficient amount of data are presented to the user based on the amount of objects in this fragment. For example, an object detection algorithm is used to verify that the image contains sufficient objects during capture, and is later used to isolate the image fragments containing the objects. This avoids showing the user ambiguous fragments, such as sky, walls, fabrics, and/or the like, which are not informative enough to properly be identified by the user. The challenge set may comprise m random fragments out of the secure portfolio images and n-m random fragment from random images, such as a large number of images unknown to the user (i.e. from stock image sets). For each authentication challenge, the server creates a new challenge set. The user task is to choose which of the presented fragments are of environments the user recognizes, and thus from the secure portfolio. When the user correctly identifies all secure portfolio fragments, the user is authenticated.

Figure 4:
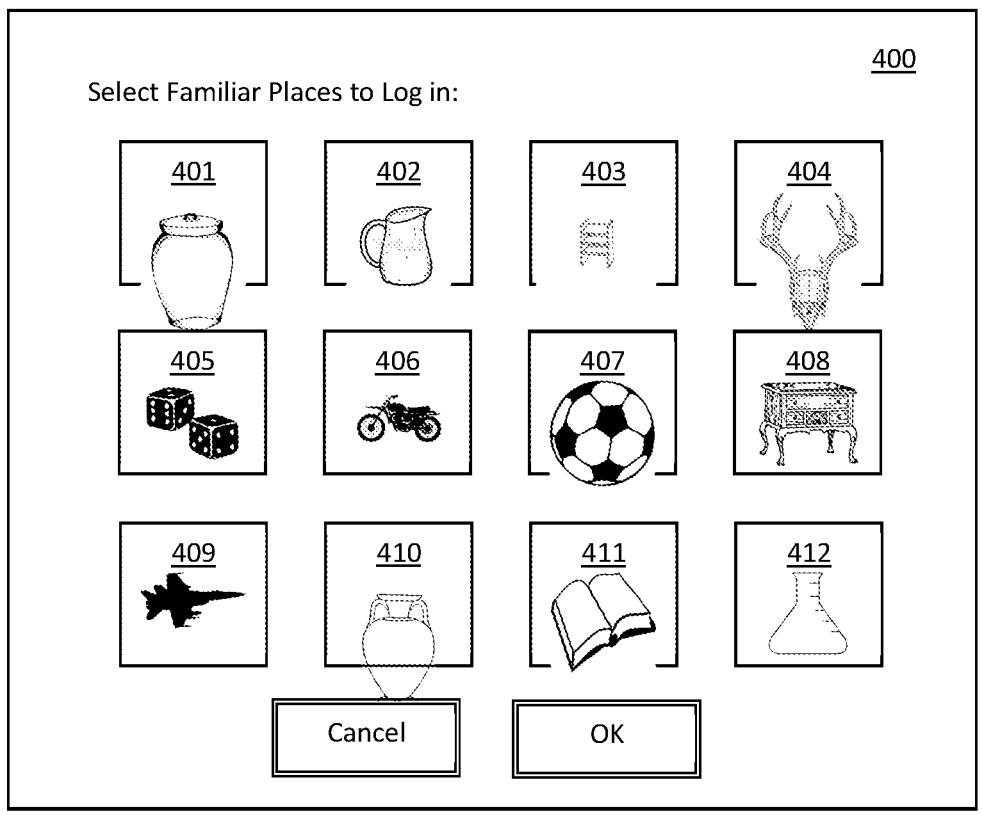
FIG. 4 shows schematically an example screen for selecting image file fragments in user authentication.

Reference is now made to FIG. 4, which shows schematically an example screen 400 for selecting image file fragments in user authentication. User may be presented with a grid of image fragments 401 thru 412, and may be requested to press each fragment of a familiar object and/or place. Once all familiar fragments are selected, the user may press the OK button to receive authentication. Otherwise, the user may press cancel to abort the authentication.

Figure 5:
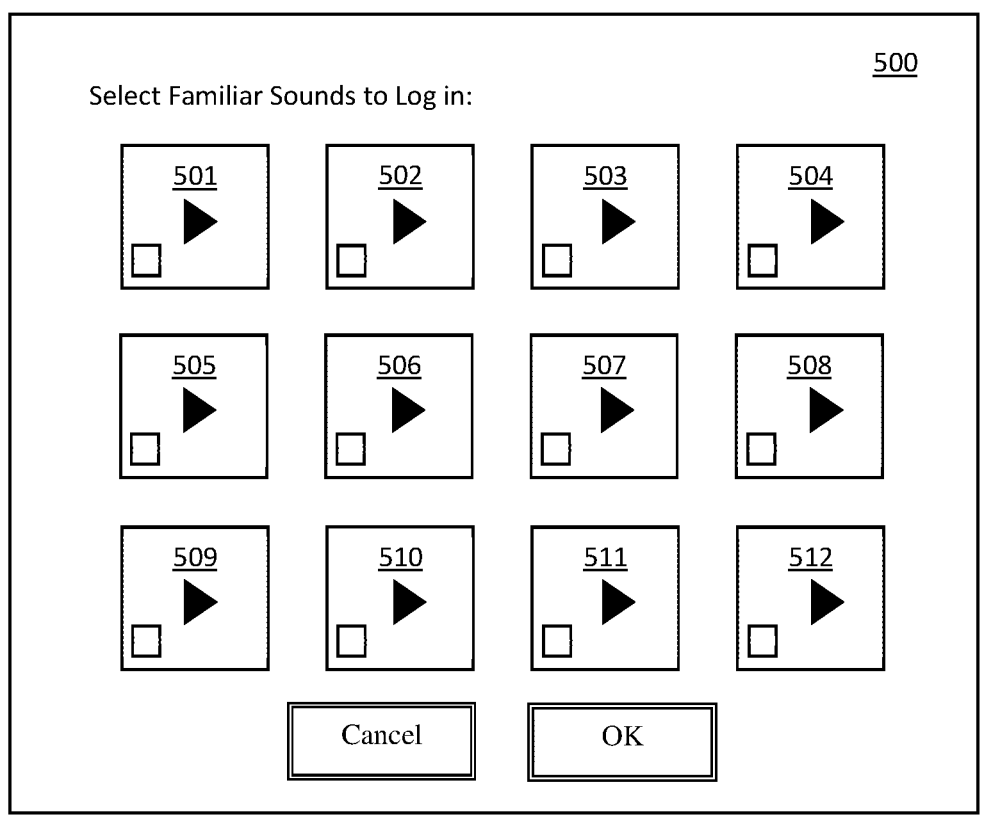
FIG. 5 shows schematically an example screen for selecting sound file fragments in user authentication.

Reference is now made to FIG. 5, which shows schematically an example screen 500 for selecting sound file fragments in user authentication. User may be presented with a grid of sound fragments 501 thru 512, and may be requested to select each fragment of a familiar sounds and/or video, such as using a check box. For example, the user may press a "play" button to hear each fragment. Once all familiar fragments are selected, the user may press the OK button to receive authentication. Otherwise, the user may press cancel to abort the authentication.

If an attacker/imposter attempts to impersonate a user by picking random fragments in the challenge set, hoping that they are part of a user's secure portfolio, the probability of success is $$\frac{1}{\sum_{m \in M} \binom{n}{m}},$$

which depends on the choice of n, the total number of fragments in the challenge set, and M, the total number of fragments from the secure portfolio images. For example, the user is presented with 3 challenges, containing 6, 8, and 10 image fragments respectively for each challenge, from the secure portfolio images out of 30 fragments in the challenge set (i.e., n=30 and M={6,8,10}), we get $$\frac{1}{\sum_{m \in \{6,8,10\}} \binom{30}{m}} = \frac{1}{36,491,715},$$

which is better than a seven-digit PIN. To prevent brute-force attacks, the system may deny access after a small number of trials.

A typical something you know authentication method may be based on an authentication question (such as a security question, e.g. "What was the name of your high school?") and its answer. To authenticate the user, the user may be presented with the security question and authentication requires answering the question correctly. The main problem with security questions is that the answers may often be public knowledge, which may be found for example using a search engine. When the user inserts more complicated questions the user may forget the answer. In addition, social authentication, such as using images of friends from Facebook®, may be less secure due to use of picture search engines that an imposter may use to identify a user's friends. Another approach is the use of user recognized images for authentication, however these may also be found using image search engines.

The method described herein may not use the images themselves as something you know, but rely on existing knowledge that the user has about their environment with the images only serving as an intermediate medium to communicate this knowledge between the user and the authentication server. The goal of this technique is to enable a user's authentication based on something they are familiar with previously and without the risk they may forget the authentication data. Unlike other methods which require a training phase at which users are required to learn information (e.g., images) that they may need to remember when they are authenticated, our strategy is to use something that users already know. The method is based on the observation that people have an excellent memory for their close environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising using at least one hardware processor for:

during a signup process of a user:
(a) receiving, by a server, over a network, audiovisual data captured in real-time by one or more sensors of a client terminal associated with the user, wherein the audiovisual data contains recorded audio and images of the physical environment surrounding the client terminal, wherein the physical environment is familiar to the user;
(b) extracting, by the server, a plurality of captured media fragments from the audiovisual data, such that the captured media fragments contain fragments of audio and images, wherein the captured media fragments are split among multiple servers;

during an authentication process of the user:
(c) retrieving, by the server, a plurality of random media fragments from a database;
(d) sending, by the server, the plurality of captured media fragments and the plurality of random media fragments to the client terminal or to a different client terminal;
(e) presenting to the user, by the client terminal or by the different client terminal, a challenge set that comprises the plurality of captured media fragments and the plurality of random media fragments in an arbitrary order, wherein each of the multiple servers contributes a part of the challenge set;
(f) tasking the user with selecting those fragments of the challenge set which the user recognizes from the physical environment surrounding the client terminal;
(g) receiving the selection of the user from the client terminal or the different client terminal;
(h) authenticating the user, by the server, when the selection correctly identifies all the plurality of captured media fragments in the challenge set; and
(i) sending the user authentication to a secure server module within the server.

2. The method according to claim 1, wherein, in step (e), the fragments of images are presented on a grid on a display connected to the client terminal or the different client terminal.

3. The method according to claim 1, wherein the receiving is performed iteratively until a specific number of the plurality of captured media fragments have been detected in the audiovisual data.

4. The method according to claim 1, wherein the extracting is performed, with respect to the fragments of images, using an object fragment detection algorithm.

5. The method according to claim 1, wherein the selection is made by the user on a user interface of the client terminal or the different client terminal.

6. A computer program product comprising a non-transitory computer-readable storage medium having program code embodied therewith, the program code executable by at least one hardware processor to:

during a signup process of a user:
(a) receive, by a server, over a network, audiovisual data captured in real-time by one or more sensors of a client terminal associated with the user, wherein the audiovisual data contains recorded audio and images of the physical environment surrounding the client terminal, wherein the physical environment is familiar to the user;
(b) extract, by the server, a plurality of captured media fragments from the audiovisual data, such that the captured media fragments contain fragments of audio and images, wherein the captured media fragments are split among multiple servers;

during an authentication process of the user:
(c) retrieve, by the server, a plurality of random media fragments from a database;
(d) send, by the server, the plurality of captured media fragments and the plurality of random media fragments to the client terminal or to a different client terminal;
(e) present to the user, by the client terminal or by the different client terminal, a challenge set that comprises the plurality of captured media fragments and the plurality of random media fragments in an arbitrary order, wherein each of the multiple servers contributes a part of the challenge set;
(f) task the user with selecting those fragments of the challenge set which the user recognizes from the physical environment surrounding the client terminal;
(g) receive the selection of the user from the client terminal or the different client terminal;
(h) authenticate the user, by the server, when the selection correctly identifies all the plurality of captured media fragments in the challenge set; and
(i) send the user authentication to a secure server module within the server.

7. The computer program product according to claim 6, wherein, in step (e), the fragments of images are presented on a grid on a display connected to the client terminal or the different client terminal.

8. The computer program product according to claim 6, wherein the receiving is performed iteratively until a specific number of the plurality of captured media fragments have been detected in the audiovisual data.

9. The computer program product according to claim 6, wherein the extracting is performed, with respect to the fragments of images, using an object fragment detection algorithm.

10. The computer program product according to claim 6, wherein the selection is made by the user on a user interface of the client terminal or the different client terminal.

11. A system, comprising:
at least one hardware processor; and
a non-transitory computer-readable storage medium having program code embodied therewith, the program code executable by the at least one hardware processor to:

during a signup process of a user:
(a) receive, by a server, over a network, audiovisual data captured in real-time by one or more sensors of a client terminal associated with the user, wherein the audiovisual data contains recorded audio and images of the physical environment surrounding the client terminal, wherein the physical environment is familiar to the user;

(b) extract, by the server, a plurality of captured media fragments from the audiovisual data, such that the captured media fragments contain fragments of audio and images, wherein the captured media fragments are split among multiple servers;

during an authentication process of the user:

(c) retrieve, by the server, a plurality of random media fragments from a database;

(d) send, by the server, the plurality of captured media fragments and the plurality of random media fragments to the client terminal or to a different client terminal;

(e) present to the user, by the client terminal or by the different client terminal, a challenge set that comprises the plurality of captured media fragments and the plurality of random media fragments in an arbitrary order, wherein each of the multiple servers contributes a part of the challenge set;

(f) task the user with selecting those fragments of the challenge set which the user recognizes from the physical environment surrounding the client terminal;

(g) receive the selection of the user from the client terminal or the different client terminal;

(h) authenticate the user, by the server, when the selection correctly identifies all the plurality of captured media fragments in the challenge set; and (i) send the user authentication to a secure server module within the server.

12. The system according to claim 11, wherein, in step (e), when the fragments of images are presented on a grid on a display connected to the client terminal or the different client terminal.

13. The system according to claim 11, wherein the receiving is performed iteratively until a specific number of the plurality of captured media fragments have been detected in the audiovisual data.

14. The system according to claim 11, wherein the extracting is performed, with respect to the fragments of images, using an object fragment detection algorithm.

* * * * *